United States Patent
Liu

(10) Patent No.: US 8,934,914 B2
(45) Date of Patent: Jan. 13, 2015

(54) KEY SEPARATION METHOD AND DEVICE

(71) Applicant: Huawei Technologies Co., Ltd., Shenzhen, Guangdong (CN)

(72) Inventor: Xiaohan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/757,258

(22) Filed: Feb. 1, 2013

(65) Prior Publication Data

US 2013/0143532 A1 Jun. 6, 2013

Related U.S. Application Data

(63) Continuation of application No. PCT/CN2011/074617, filed on May 25, 2011.

(30) Foreign Application Priority Data

Aug. 2, 2010 (CN) .......................... 2010 1 0246928

(51) Int. Cl.
- *H04W 36/00* (2009.01)
- *H04M 1/66* (2006.01)
- *H04M 1/00* (2006.01)
- *H04W 12/04* (2009.01)

(Continued)

(52) U.S. Cl.
CPC .............. *H04W 12/04* (2013.01); *H04W 12/06* (2013.01); *H04W 36/04* (2013.01); *H04W 84/045* (2013.01)
USPC ..................... 455/444; 455/552.1; 455/426.1; 455/410

(58) Field of Classification Search
USPC ............. 455/432.1–444, 426.1, 552.1, 553.1, 455/456.1–457, 410–411; 726/1–21; 380/247–250, 255, 258, 259, 270–273
See application file for complete search history.

(56) References Cited

U.S. PATENT DOCUMENTS

2002/0066011 A1* 5/2002 Vialen et al. ................... 713/150
2006/0128362 A1* 6/2006 Bae et al. ...................... 455/411

(Continued)

FOREIGN PATENT DOCUMENTS

| CN | 101192919 A | 6/2008 |
| CN | 101472277 A | 7/2009 |

(Continued)

OTHER PUBLICATIONS

3GPP TS 33.102, dated Mar. 2010.*
ETSI TS 133 401 v.9.2.0, dated Jan. 2010.*
Written Opinion of the International Searching Authority in corresponding PCT Patent Application No. PCT/CN2011/074617 (Sep. 1, 2011).
International Search Report in corresponding PCT Patent Application No. PCT/CN2011/074617 (Sep. 1, 2011).

(Continued)

*Primary Examiner* — Daniel Lai
(74) *Attorney, Agent, or Firm* — Leydig, Voit & Mayer, Ltd.

(57) ABSTRACT

A key separation method and device are provided in the embodiments of the present invention. The key separation method includes: when a User Equipment hands over from a source node to a target node, or when the User Equipment moves from the source node to the target node in idle state, determining whether or not the source node is a Home NodeB; and if the source node is a Home NodeB, triggering an Authentication and Key Agreement procedure according to the operator's policy, to update Ciphering Key and Integrity Key. By performing Authentication and Key Agreement procedure, the method and device of the embodiments separate key of the source node from the key of the target node.

15 Claims, 11 Drawing Sheets

(51) Int. Cl.
  *H04W 12/06* (2009.01)
  *H04W 36/04* (2009.01)
  *H04W 84/04* (2009.01)

(56) References Cited

U.S. PATENT DOCUMENTS

| | | | |
|---|---|---|---|
| 2009/0209259 | A1 | 8/2009 | Brusilovsky et al. |
| 2009/0265542 | A1* | 10/2009 | Khetawat et al. ............ 713/151 |
| 2009/0274302 | A1 | 11/2009 | Wu et al. |
| 2010/0040023 | A1 | 2/2010 | Gallagher et al. |
| 2010/0172500 | A1* | 7/2010 | Wu ............................... 380/272 |
| 2011/0201337 | A1* | 8/2011 | Forsberg et al. ............. 455/436 |
| 2012/0328103 | A1 | 12/2012 | Feng et al. |

FOREIGN PATENT DOCUMENTS

| | | |
|---|---|---|
| CN | 101499899 A | 8/2009 |
| CN | 101610147 A | 12/2009 |
| CN | 101610506 A | 12/2009 |
| CN | 101631306 A | 1/2010 |
| CN | 101742498 A | 6/2010 |
| EP | 2109278 A1 | 10/2009 |
| EP | 2293610 A | 3/2011 |

OTHER PUBLICATIONS

1st Office Action in corresponding Chinese Patent Application No. 201010246928.X (Jun. 5, 2013).

Chinese Search Report in corresponding Chinese Patent Application No. 201010246928.X (May 28, 2013).

"3rd Generation Partnership Project; Technical Specification Group Services and System Aspects; Security of Home Node B (HNB)/Home evolved Node B (HeNB) (Release 9)," 3GPP, TS 33.320, V9.2.1, pp. 1-33, 3rd Generation Partnership Project, Valbonne, France (Jun. 2010).

"Key freshness during mobility from E-UTRAN to UTAN/GERAN," 3GPP TSG SA WG3 Security—S3#52, Sophia-Antipolis, France, S3-080838, Change Request 33.401, CR0017, 3rd Generation Partnership Project, Valbonne, France (Jun. 23-27, 2008).

"Universal Mobile Telecommunications System (UMTS); UTAN architecture for 3G Home Node B (HNB); Stage 2 (3GPP TS 25.467 version 9.2.0 Release 9)," ETSI TS 125 467, V9.2.0,pp. 1-36, European Telecommunications Standards Institute, 3rd Generation Partnership Project, Valbonne, France (Apr. 2010).

"3rd Generation Partnership Project; Technical Specification Group Services and System Aspects; 3GPP System Architecture Evolution (SAE); Security architecture (Release 9)," 3GPP TS 33.401, V.4.0, pp. 1-104, 3rd Generation Partnership Project, Valbonne, France (Jun. 2010).

* cited by examiner

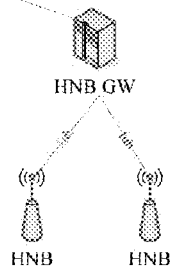
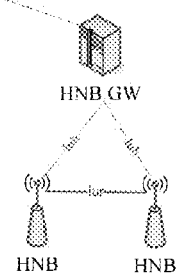
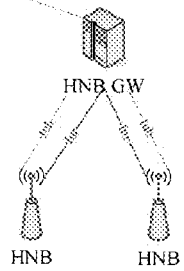

FIG. 1A     FIG. 1B     FIG. 1C

When a User Equipment hands over from a source node to a target node, or when the User Equipment moves from the source node to the target node in idle state, an SGSN determines whether or not the source node is a Home NodeB — 201

If the source node is a Home NodeB, the SGSN triggers an Authentication and Key Agreement procedure according to the operator's policy, to update CK and IK — 202

FIG. 2

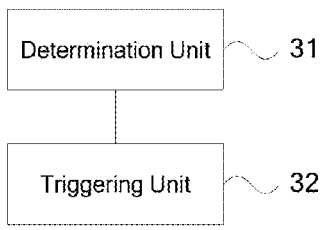

FIG. 3

KEY SEPARATION METHOD AND DEVICE

CROSS-REFERENCE TO RELATED APPLICATIONS

This application is a continuation of International Patent Application No. PCT/CN2011/074617, filed on May 25, 2011, which claims priority to Chinese Patent Application No. 201010246928.X, filed on Aug. 2, 2010, both of which are hereby incorporated by reference in their entireties.

TECHNICAL FIELD

The present invention relates to the field of communication, and particularly to a key separation method and device.

BACKGROUND ART

The UMTS R9 (Universal Mobile Telecommunications System) standard defines the handover scheme between a macro cell and a HNB (Home NodeB), and the handover scheme between HNBs. In R9, the handover between macro cell and HNB and the handover between HNBs can employ a common hard handover procedure, and the SGSN (Serving GPRS Support Node) of the Core Network (CN) can participate in the whole handover procedure.

Since HNB covers a relatively smaller range (usually covers the range of several tens of meters), several HNB may be deployed in the same application scenario, and handover between HNB cells may occur due to the movement of the mobile user. When such handover frequently occurs, it brings corresponding burden to the network side. In order to reduce the impact to CN (Core Network), to HNBs under the same HNB Gateway (GW), there may be a handover optimizing scheme that the handover signaling between HNBs is terminated at the HNB GW in case that no Iur interface exists between HNBs, as illustrated in FIG. 1A; there may be another handover optimizing scheme that the handover signaling between HNBs is forwarded via the HNB GW and terminated at the HNB GW in case that Iur interface exists between HNBs, as illustrated in FIG. 1C; or there may be still another handover optimizing scheme that the handover signaling between the HNBs is directly transferred via the Iur interface in case that Iur interface exists between HNBs, as illustrated in FIG. 1B.

Nowadays, in UMTS system, during the hard handover procedure where the handover signaling is terminated at the SGSN, if the source node is HNB, CK (Ciphering Key) and IK (Integrity Key) will not change after the UE is handed over from the source HNB to the target node (including RNC or HNB), i.e., the source HNB knows the key used by the target node; due to the vulnerability of HNB's location (unlike the RNC that is located in the operator's computer room), an attacker will acquire the key of the target node if it acquires the key of the source HNB. Similarly, with respect to the handover between HNBs under the same HNB GW in UMTS system, in the case that an Iur interface exists between HNBs, the security problem of key separation will also occur after the UE is handed over from the source HNB to the target HNB. Further, in UMTS system, similarly to the above handover scenario, the security problem of key separation will also occur when UE moves from an HNB to the RNC or another HNB in idle mode.

SUMMARY OF THE INVENTION

The embodiments of the present invention provide a key separation method and device, so that the source HNB and the target HNB/RNC use separate keys for the ciphering and integrity protection.

The above object of the embodiments of the present invention is achieved by the following technical solutions:

a key separation method applicable to a SGSN (Serving GPRS Support Node), including: when a User Equipment hands over from a source node to a target node, or when the User Equipment moves from the source node to the target node in an idle state, determining whether the source node is a Home NodeB; and if the source node is the Home NodeB, triggering an Authentication and Key Agreement procedure according to the operator's policy, to update Ciphering Key and Integrity Key.

A SGSN, including: a determining unit, configured to determine whether a source node is a Home NodeB, HNB, when a User Equipment hands over from the source node to a target node, or when the User Equipment moves from the source node to the target node in idle state; and a triggering unit, configured to trigger an Authentication and Key Agreement procedure according to the operator's policy, when the determining unit determines that the source node is the Home NodeB, so as to update Ciphering Key and Integrity Key.

A key separation method applicable to a Home NodeB Gateway or a User Equipment or a target Home NodeB, including: when a User Equipment hands over from a source node to a target node, or when the User Equipment moves from the source node to the target node in idle state, determining whether the source node is the Home NodeB; and if the source node is the HNB, sending a notification message to a SGSN to trigger the SGSN to perform an Authentication and Key Agreement procedure, so as to update Ciphering Key and Integrity Key.

A Home NodeB Gateway, including: a determining unit, configured to determine whether a source node is a Home NodeB, when a User Equipment hands over from the source node to a target node; and a sending unit, configured to send a notification message to a SGSN, when the determining unit determines that the source node is the Home NodeB, to trigger the SGSN to perform an Authentication and Key Agreement procedure.

A User Equipment, including: a determining unit, configured to determine whether a source node is a Home NodeB, when the User Equipment hands over from the source node to a target node, or when the User Equipment moves from the source node to the target node in idle state; and a sending unit, configured to send a notification message to a SGSN, when the determining unit determines that the source node is the Home NodeB, to trigger the SGSN to perform an Authentication and Key Agreement procedure.

A target Home NodeB, including: a determining unit, configured to determine whether a source node is a Home NodeB, when a User Equipment hands over from the source node to a target node; and a sending unit, configured to send a notification message to a SGSN, when the determining unit determines that the source node is the Home NodeB, to trigger the SGSN to perform an Authentication and Key Agreement procedure.

A key separation method applicable to a SGSN, including: when a User Equipment hands over from a source node to a target node, determining whether the source node is a Home NodeB; if the source node is the Home NodeB, selecting one from a plurality of locally stored Authentication Vectors, and using a Ciphering Key and Integrity Key corresponding to the selected Authentication Vector as a key used by the User Equipment at the target node; and sending a random number corresponding to the selected Authentication Vector to the User Equipment, so that the User Equipment generates the Ciphering Key and Integrity Key according to the random number.

A SGSN, including: a first determining unit, configured to determine whether a source node is a Home NodeB, when a User Equipment hands over from the source node to a target node; a selection unit, configured to select one from a plurality of locally stored Authentication Vectors, when the first determining unit determines that the source node is the Home NodeB, and use Ciphering Key and Integrity Key corresponding to the selected Authentication Vector as a key used by the User Equipment at the target node; and a sending unit, configured to send a random number corresponding to the Authentication Vector selected by the selection unit to the User Equipment, so that the User Equipment generates the Ciphering Key and Integrity Key according to the random number.

A key separation method applicable to a User Equipment, including: when the User Equipment hands over from a source node to a target node, receiving from the source node, a Radio Resource Control connection reconfiguration message including a random number corresponding to an Authentication Vector selected by a SGSN; generating Ciphering Key and Integrity Key according to the random number, and using the Ciphering Key and Integrity Key as keys used at the target node.

A User Equipment, including: a receiving unit, configured to receive from a source node, a Radio Resource Control connection reconfiguration message including a random number corresponding to an Authentication Vector selected by a SGSN, when the User Equipment hands over from the source node to a target node; and a generation unit, configured to generate Ciphering Key and Integrity Key according to the random number in the Radio Resource Control connection reconfiguration message received by the receiving unit, and use the Ciphering Key and Integrity Key as keys used at the target node.

The methods and devices of the embodiments may separate the keys of the source node and the target node by reselecting Ciphering and Integrity Key used by a new target node or performing an Authentication and Key Agreement procedure.

BRIEF DESCRIPTION OF THE DRAWINGS

The drawings described herein provide a further understanding of the present invention, and construct a part of the present application rather than limitations to the present invention, in which:

FIGS. 1A-1C are schematic diagrams of currently optimized handover architectures;

FIG. 2 is a flowchart of a method on SGSN side according to the first embodiment of the present invention;

FIG. 3 is a constitutional block diagram of a SGSN according to the first embodiment of the present invention;

DETAILED DESCRIPTION OF THE INVENTION

Figure 4:
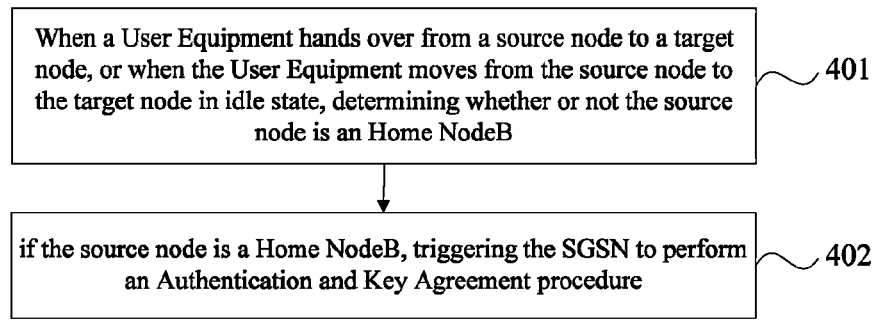
FIG. 4 is a flowchart of a method on HNB GW side, or HNB side, or UE side according to the first embodiment of the present invention.

In order that the object, technical solutions and advantages of the embodiments of the present invention are more apparent, the embodiments of the present invention are further detailedly described as follows with reference to the embodiments and drawings. Herein, the exemplary embodiments of the present invention and the descriptions thereof are just explanations of the present invention rather than limitations thereto.

Embodiment 1

FIG. 2 is a flowchart of a key separation method provided by the embodiment. In this embodiment, an SGSN itself triggers an Authentication and Key Agreement (AKA) procedure to update Ciphering Key and Integrity Key CK and IK, in order to separate keys of the source node and the target node. Please refer to FIG. 2, the method is applied to SGSN, including:

Step 201: when a User Equipment hands over from a source node to a target node, or when the User Equipment moves from the source node to the target node in idle state, an SGSN determines whether the source node is a Home NodeB;

wherein, the method of this embodiment is used for a key separation, and thus the method may be performed when the key separation is required. Thus, in step 201, when a User Equipment hands over from a source node to a target node may either mean that the User Equipment is handing over from the source node to the target node, or mean that the User Equipment has handed over from the source node to the target node. In addition, when the User Equipment moves from a source node to a target node in idle state may either mean that the User Equipment is moving from the source node to the target node in idle state, or mean that the User Equipment has moved from the source node to the target node. The similar expressions have similar meanings, and redundant description will be omitted.

In one example, the method for SGSN to judge whether the source node is an HNB may be: if the source node is an HNB, the relocation request message sent by the source HNB to the SGSN carries an RNC ID of an HNB GW; the SGSN can determine that the relocation request message was forwarded by the HNB GW (the HNB GW will be registered to the SGSN when accessing the network), thereby the SGSN can recognize that the source node is an HNB.

In another example, the method for SGSN to judge whether the source node is an HNB may be: if the relocation request message received by the SGSN was forwarded by the HNB GW, the SGSN can determine that the source node is an HNB.

The above two methods for SGSN to judge whether the source node is an HNB are just examples, and the embodiment is not limited thereto.

Step 202:

According to the method of this embodiment, the SGSN may send CK and IK to the target node through a SMC (Security Mode Command) procedure, so that the source node and the target node use different CKs and IKs, so as to realize a key separation.

In one example, the SGSN is configured to further confirm whether the target node is a Radio Network Controller RNC. At that time, the SGSN is configured to, when the source node is an HNB and the target node is an RNC, trigger the performing of AKA according to the operator's policy to perform a key separation, i.e., to trigger the Authentication and Key Agreement procedure according to the operator's policy, to update CK and IK.

In another example, if the UE moves from the source node (e.g., HNB) to the target node (e.g., RNC) in idle state, the SGSN also triggers AKA to update CK and IK, after finding that the UE moves from the HNB to the RNC.

Wherein, when the UE moves from the HNB to the RNC in idle state without a RAU (Routing Update), the SGSN cannot trigger the performing of AKA since the SGSN cannot recognize that the UE has moved from the HNB to the RNC, but it is the UE that triggers the SGSN to perform AKA. This will be described in the following embodiment.

In this embodiment, triggering the performing of AKA according to the operator's policy may include: triggering the performing of AKA after the UE has handed over from the source node to the target node, or after the UE has moved from the source node to the target node in idle state, or a Home NodeB Gateway of the source node receives an IU Interface Release message.

Wherein, during the signaling procedure that the SGSN sends an updated CK and IK to the target node (e.g., the target HNB or RNC, hereinafter referred to as target HNB/RNC) through the SMC procedure, in order to ensure that the target node can select an appropriate ciphering and integrity protection algorithm, the target node may add the UE security capability into a security mode command message forwarded to the UE, so that the UE performs an verifying according to the UE security capability sent by the target node to ensure the security. The method for verifying the UE security capability includes:

the target node forwards to the UE a security mode command sent by the SGSN, wherein the security mode command includes the UE security capability of the UE, so that the UE verifys the UE security capability.

Wherein, after verifying the UE security capability, the UE returns a result of verifying to the target node through a security mode completion message, thus the target node can further receive the security mode completion message, including the result of verifying of the UE security capability, returned by the UE.

In addition, the target node may request UE for a UE capability through an independent UE capability request message after the handover is completed, and verify the UE capability after the UE returns its UE capability, thereby similarly achieving the object of ensuring the security. The method for verifying the UE security capability includes:

after the handover is completed, the target node sends a UE capability request message to the UE, to request the UE to return its security capability to the target node;

the target node verifys the UE security capability according to the UE security capacity returned by the UE.

The method of this embodiment achieves the separation of the keys of the source node and the target node by trigger the performing of AKA by SGSN itself and updating Ciphering Key and Integrity Key (CK and IK) used by the target node through SMC.

FIG. 3 is a constitutional block diagram of an SGSN of this embodiment. Please refer to FIG. 3, the SGSN includes:

a determining unit 31, configured to determine whether a source node is a Home NodeB, when a User Equipment hands over from the source node to a target node, or when the User Equipment moves from the source node to the target node in idle state;

a triggering unit 32, configured to trigger an AKA procedure according to the operator's policy, when the determining unit 31 determines that the source node is an Home NodeB, to update CK and IK.

In one example, the determining unit 31 is further configured to determine whether the target node is a Radio Network Controller RNC, and the triggering unit 32 is specifically configured to trigger AKA procedure according to the operator's policy, when the source node is an HNB and the target node is a RNC, to update the CK and the IK.

In one example, the triggering unit 32 is configured to trigger AKA procedure after the UE has handed over from the source node to the target node, or the UE has moved from the source node to the target node in idle state, or an Home NodeB Gateway of the source node has received an IU Interface Release message.

The SGSN of this embodiment is corresponding to the method of the embodiment as illustrated in FIG. 2. The steps have been detailedly described in the embodiment as illustrated in FIG. 2, and herein redundant description is omitted. The SGSN of this embodiment itself triggers AKA procedure, and updates Ciphering Key and Integrity Key (CK and IK) used by the target node through the SMC procedure, thereby realizing the separation of the keys of the source node and the target node.

FIG. 4 is a flowchart of a key separation method provided by the embodiment. The method is applicable to an HNB GW, or a target HNB or a UE, sends a notification message to an SGSN to trigger the SGSN to perform an AKA procedure, so as to update CK and IK, thereby realizing the object of key separation. Please refer to FIG. 4, the method includes:

Step 401: when a User Equipment hands over from a source node to a target node, or when the User Equipment moves from the source node to the target node in idle state, determining whether the source node is a Home NodeB.

In one example, when the method is applied to an HNB GW or a target HNB, the HNB GW or the target HNB may determine whether the source node is an Home NodeB when an UE hands over from the source node to the target node.

Wherein, since the HNB is registered from the HNB GW, a relocation request message sent by the HNB to the HNB GW carries an RNC ID of the HNB GW. Therefore, the HNB GW can judge whether the source base station is an HNB, and then notify the SGSN to trigger AKA procedure at an appropriate time. In addition, since the relocation request message will be sent to the HNB GW only when the source node is an HNB, the HNB GW may determine that the source node is an HNB upon the reception of the relocation request message.

The above two methods for the HNB GW to determine whether the source node is an HNB are just examples, and this embodiment is not limited thereto.

Wherein, when finding that an RNC ID carried in the enhanced relocation request message is as same as its RNC ID, the target HNB can judge whether the source base station is an HNB based thereon, thereby notify the SGSN to trigger AKA procedure at an appropriate time. In addition, the target HNB may also determine whether the source node is an HNB based on the range of the source node acquired through SGSN synchronization. For example, the SGSN may set different address ranges for the HNB and the RNC, and synchronize them to the HNB GW and the HNB. Then the target HNB may determine whether the source node is an HNB based on the address range when the determining is needed. The above two methods for the target HNB to determine whether the source node is an HNB are just examples, and this embodiment is not limited thereto.

In another example, when the method is applied to UE, the UE may determine whether the source node is an Home NodeB in a case where the UE hands over from the source node to the target node, or in a case where the UE moves from the source node to the target node in idle state.

Wherein, the UE recognize by itself whether the base station where it resides is an HNB. Therefore, the UE can determine whether the source node is an Home NodeB. In addition, the UE may determine which base stations are HNBs by reading broadcast messages, and then recognizes whether the source base station where it is registered is an HNB. The above two methods for the UE to determine whether the source node is an HNB are just examples, and this embodiment is not limited thereto.

Step 402: if the source node is a Home NodeB, sending a notification message to the SGSN to notify the SGSN to delete the security context thereon, and to trigger the SGSN to perform an Authentication and Key Agreement procedure so as to update CK and IK.

In one example, when the method is applied to the HNB GW or the UE, the HNB GW or the UE may further determine whether the target node is a Radio Network Controller (RNC), and when the source node is an HNB and the target node is a RNC, trigger the SGSN to perform an AKA for key separation, i.e., send a notification message to the SGSN to notify the SGSN to delete the security context thereon, and trigger the SGSN to perform an Authentication and Key Agreement procedure so as to update CK and IK.

Wherein, when the method is applied to the HNB GW, the HNB GW sends the above notification message to the SGSN to trigger the SGSN to perform AKA, if the HNB GW receives an IU Release (Release) message, or the UE turns into an idle state from the active state, or the handover of the User Equipment from the source node to the target node is completed.

Wherein, when the method is applied to the target HNB, the target HNB sends the above notification message to the SGSN to trigger the SGSN to perform AKA, if the handover of the User Equipment from the source node to the target node is completed, or the UE turns into an idle state from the active state.

Wherein, when the method is applied to the UE, the User Equipment sends the notification message to the SGSN to trigger the SGSN to perform AKA, if the handover of the User Equipment from the source node to the target node is completed, or the movement of the User Equipment from the source node to the target node in idle state is completed, or the User Equipment turns into idle state from the active state, or the User Equipment sets every bit of the locally stored KSI to 1, or the UE sets the locally stored state value as a threshold value.

With the method of this example, the HNB GW, the target HNB or the UE may trigger the SGSN to perform AKA through a notification message at an appropriate time, to update the CK and the IK, and enable the SGSN to send the CK and the IK to the target node through SMC procedure, so that the UE uses new CK and IK at the target node, thereby separating the key of the source node from that of the target node.

Wherein, during the signaling procedure in which the SGSN sends updated CK and IK to the target node (e.g., the target HNB or RNC, hereinafter referred to as target HNB/RNC) through SMC procedure, in order to ensure that the target node can select an appropriate ciphering and integrity protection algorithm, the target node may add the UE security capability to a security mode command message forwarded to the UE, so that the UE performs verifying according to the UE security capability sent by the target node to ensure security. In addition, the target node may request the UE for UE capability through an independent UE capability request message after the handover is completed, and verify the UE capability after the UE returns its UE capability, thereby ensuring the security. The detailed steps of the above method have been described in the embodiment as illustrated in FIG. 2, and herein are not repeated.

Figure 5:
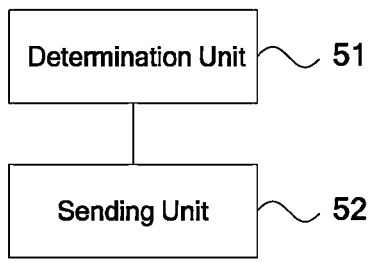
FIG. 5 is a constitutional block diagram of a HNB GW according to the first embodiment of the present invention.

FIG. 5 is a constitutional block diagram of an Home NodeB Gateway of this embodiment. Please refer to FIG. 5, the Home NodeB Gateway includes:

a determining unit 51, configured to determine whether a source node is a Home NodeB, when a User Equipment hands over from the source node to a target node; and a sending unit 52, configured to send a notification message to a SGSN, when the determining unit 51 determines that the source node is the Home NodeB, to trigger the SGSN to perform an Authentication and Key Agreement procedure.

In one example, the determining unit 51 is configured to further determine whether the target node is a Radio Network Controller (RNC), and the sending unit 52 is specifically configured to send a notification message to the SGSN when the source node is an HNB and the target node is a RNC, to trigger the SGSN to perform Authentication and Key Agreement procedure.

The HNB GW of this example may trigger the SGSN to perform an AKA procedure at an appropriate time, e.g., after an IU Release message is received, or the handover of the User Equipment from the source node to the target node is completed, or the UE turns into an idle state from an active state, to update CK and IK, so that the SGSN sends the CK and the IK to the target node through SMC procedure, and the UE uses new CK and IK at the target node, thereby achieving the separation of the key of the source node from that of the target node.

The constituent parts of the HNB GW of this example are used for implementing the steps of the aforementioned embodiment in which the method illustrated in FIG. 4 is applied to the HNB GW. The steps have been detailedly described in the embodiment in which the method illustrated in FIG. 4 is applied to the HNB GW, and herein the redundant description is omitted.

Figure 6:
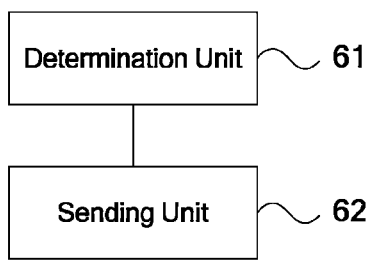
FIG. 6 is a constitutional block diagram of a target HNB according to the first embodiment of the present invention.

FIG. 6 is a constitutional block diagram of a User Equipment of this embodiment. Please refer to FIG. 6, the User Equipment includes:

a determining unit 61, configured to determine whether a source node is a Home NodeB, when the User Equipment hands over from the source node to a target node, or when the User Equipment moves from the source node to the target node in idle state; and a sending unit 62, configured to send a notification message to a SGSN, when the determining unit 61 determines that the source node is the Home NodeB, to notify the SGSN to trigger the Authentication and Key Agreement procedure.

In one example, the determining unit 61 is further configured to determine whether the target node is a Radio Network Controller (RNC), and the sending unit 62 is specifically configured to send the notification message to the SGSN when the source node is an HNB and the target node is a RNC, to notify the SGSN to trigger the Authentication and Key Agreement procedure.

The UE of this example may trigger the SGSN to perform AKA at an appropriate time, e.g., after the handover of the User Equipment from the source node to the target node is completed, or the movement of the User Equipment from the source node to the target node in idle state is completed, or the UE turns into an idle state from the active state, or the UE sets every bit of the locally stored KSI to 1, or the UE sets the locally stored state value as a threshold value, to update CK and IK, so that the SGSN sends the CK and the IK to the target node through SMC procedure, and the UE uses new CK and IK at the target node, thereby achieving the separation of the key of the source node from that of the target node.

The constituent parts of the UE of this embodiment are used for implementing the steps of the aforementioned embodiment in which the method illustrated in FIG. 4 is applied to the HNB GW. The steps have been detailedly described in the embodiment in which the method illustrated in FIG. 4 is applied to the HNB GW, and herein the redundant description is omitted.

Figure 7:
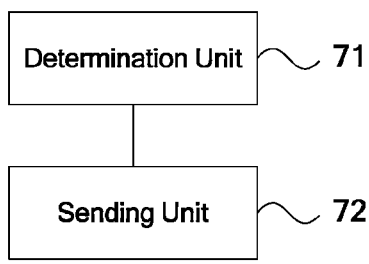
FIG. 7 is a constitutional block diagram of a UE according to the first embodiment of the present invention.

FIG. 7 is a constitutional block diagram of a target Home NodeB of this example. Please refer to FIG. 7, the target HNB includes:

a determining unit 71, configured to determine whether a source node is an Home NodeB, when the User Equipment hands over from the source node to a target node; and a sending unit 72, configured to send a notification message to an SGSN when the determining unit 71 determines that the source node is an Home NodeB, to notify the SGSN to trigger an Authentication and Key Agreement procedure.

The target HNB of this embodiment may trigger the SGSN to perform an AKA procedure at an appropriate time, e.g., after the handover of the User Equipment from the source node to the target node is completed, or the UE turns into the idle state from the active state, to update CK and IK, so that the SGSN sends the CK and the IK to the target node, and the UE uses new CK and IK at the target node, thereby achieving the separation of the key of the source node from that of the target node.

The constituent parts of the target HNB of this embodiment are used for implementing the steps of the aforementioned embodiment in which the method illustrated in FIG. 4 is applied to the HNB GW. The steps have been detailedly described in the embodiment in which the method illustrated in FIG. 4 is applied to the HNB GW, and herein the redundant description is omitted.

In order that the key separation method of this embodiment is more apparent and understandable, the detailed descriptions thereof are given as follows with reference to the flow as illustrated in FIGS. 8-11.

Figure 8:
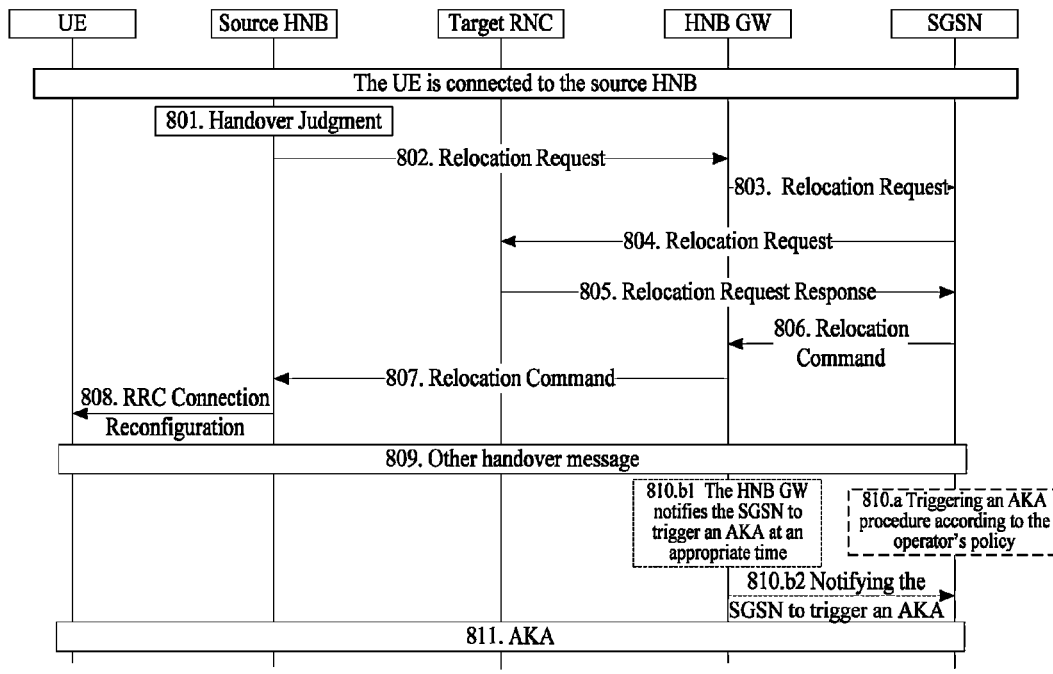
FIG. 8 is Flowchart 1 of a system interaction according to the first embodiment of the present invention.

FIG. 8 is a flowchart of a key separation method of this embodiment where a handover signaling is terminated at a CN. Please refer to FIG. 8, the flow includes:

Steps 801-809: same as the existing handover flow;

Step 810.a: the SGSN itself judges whether an AKA shall be triggered: when the source node is an HNB, or the source node is an HNB and the target node is a RNC, the SGSN performs UMTS AKA one time as soon as possible according to the operator's policy, to ensure a deletion of the UMTS security context on the SGSN.

Wherein, the method for the SGSN to judge whether the source node is an HNB has been described in step 201, and herein the redundant description is not repeated.

Wherein, the embodiment uses an example in which the UE hands over from the source node to the target node, but the embodiment is not limited thereto. For example, when the UE moves from the source node to the target node in idle state, the SGSN may trigger AKA through step 801.a, thereby separating the key of the source node from that of the target node.

Wherein, the operator's policy includes: the UE turns into idle state from active state, or the handover of the User Equipment from the source node to the target node is completed, or the movement of the User Equipment from the source node to the target node in idle state is completed, or the HNB GW receives an IU interface Release message, etc., and the embodiment is not limited thereto, as long as it is possible to ensure that the UMTS security context on the SGSN can be deleted.

Step 810.b1: the HNB GW notifies the SGSN to trigger AKA: performing step 810.b2 when the source node is an HNB, or the source node is an HNB and the target node is a RNC;

Wherein, the method for the HNB GW to determine whether the source node is an HNB has been detailedly described in step 401, and herein the redundant description is omitted.

Step 810.b2: the HNB GW triggers the SGSN to perform AKA as soon as possible at an appropriate time, e.g., after the handover of the User Equipment from the source node to the target node is completed, or the UE turns into idle state from active state, or the HNB GW receives an IU Release (IU interface release) message, etc.; the HNB GW notifies the SGSN to delete the security context on the SGSN, so that the SGSN can perform AKA one time as soon as possible.

Wherein, the HNB GW may trigger the SGSN to perform AKA as soon as possible through a notification message, but the embodiment is not limited thereto.

Step 811: the UE and the SGSN perform AKA.

With the above method, the SGSN may notify the target RNC of the CK and the IK through SMC procedure, so that the UE uses new CK and IK at the target RNC, thereby achieving the separation of the keys of the source HNB and the key of the target RNC.

Wherein, during the signaling procedure in which the SGSN sends the updated CK and IK to the target node (e.g., the target HNB or RNC, hereinafter referred to as target HNB/RNC) through SMC procedure, in order to ensure that the target node can select an appropriate ciphering and integrity protection algorithm, the target node may add the UE security capability to a security mode command message forwarded to the UE, so that the UE performs an verifying according to the UE security capability sent by the target node to ensure the security. In addition, the target node may request the UE for a UE capability through an independent UE capability request message after the handover is completed, and verify the UE capability after the UE returns its UE capability, thereby ensuring the security. The detailed steps of the above method have been described in the embodiment as illustrated in FIG. 2, and herein the redundant description is not repeated.

Figure 9:
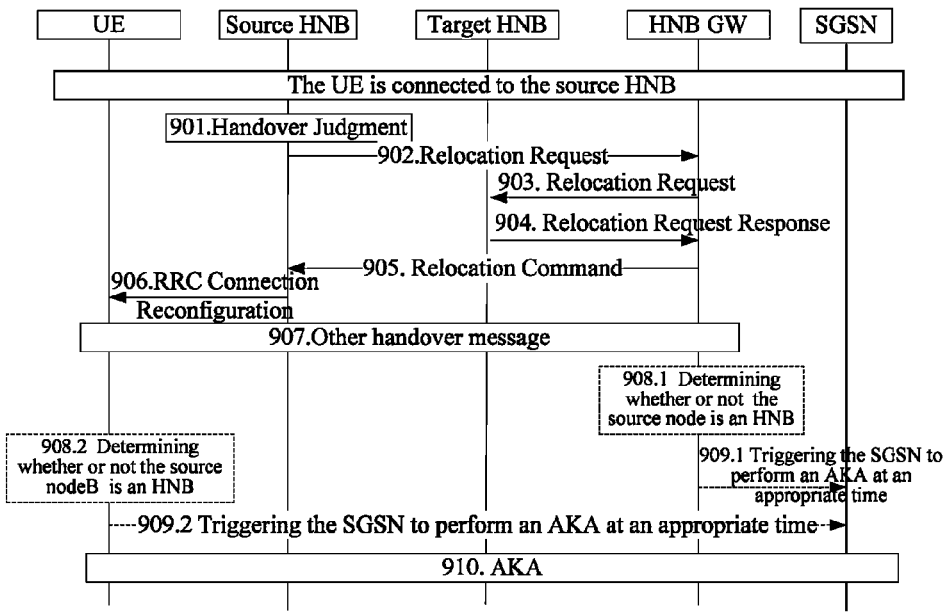
FIG. 9 is Flowchart 2 of a system interaction according to the first embodiment of the present invention.

FIG. 9 is a flowchart of a key separation method of this embodiment when a handover signaling is terminated at an HNB GW, and there is no Iur interface between the source node and the target node. Please refer to FIG. 9, the flow includes:

Steps 901-907: same as the existing handover procedure;

Step 908.1: the HNB GW notifies the SGSN to trigger AKA with the same method as illustrated in FIG. 8. When the source node is an HNB, or the source node is an HNB and the target node is an RNC, the HNB GW notifies the SGSN to trigger AKA as soon as possible at an appropriate time, e.g., after the handover of the User Equipment from the source node to the target node is completed, or the UE turns into idle state from active state, or the HNB GW receives Iu Release message; the HNB GW notifies the SGSN to delete the security context on the SGSN, so as to trigger the SGSN to perform AKA on time as soon as possible.

Wherein, the method for the HNB GW to determine whether the source node is an HNB has been detailedly described in step 401, and herein the redundant description is not repeated.

Step 908.2: the UE notifies the SGSN to trigger AKA: when the source node is an HNB, or the source node is an HNB and the target node is a RNC, the UE notifies the SGSN to trigger AKA at an appropriate time, for example, 1) after the handover of the User Equipment from the source node to the target node is completed; or 2) after the movement of the User Equipment from the source node to the target node in idle state is completed; or Wherein, the example uses the case where the UE hands over from the source node to the target node as an example, and when the UE moves from the source node to the target node in idle state, the method of the embodiment is also applicable. In that case, the UE may trigger the SGSN to perform AKA after the movement is completed.

3) after the UE turns into idle state from active state; or 4) the UE sets every bit of the stored KSI (Key Set Identifier) to 1; or 5) the UE sets stored value of "START" as threshold value "START_THRESHOLD".

The UE can trigger the SGSN to perform AKA in the above cases.

Wherein, the method for the UE to determine whether the source node is an HNB has been detailedly described in step 401, and herein the redundant description is not repeated.

909.1/909.2: the HNB GW or the UE triggers the SGSN to perform AKA;

Wherein, the SGSN may be triggered to perform AKA through a notification message, but the embodiment is not limited thereto.

910: AKA procedure.

With the above method, the SGSN may notify the target HNB of the CK and the IK through SMC procedure, so that the UE uses new CK and IK at the target HNB, thereby achieving the separation of the key of the source HNB and the key of the target HNB.

Wherein, during the signaling procedure in which the SGSN sends the updated CK and IK to the target node (e.g., the target HNB or RNC, hereinafter referred to as target HNB/RNC) through SMC procedure, in order to ensure that the target node can select an appropriate ciphering and integrity protection algorithm, the target node may add the UE security capability to a security mode command message forwarded to the UE, so that the UE performs an verifying according to the UE security capability sent by the target node to ensure the security. In addition, the target node may request the UE for a UE capability through an independent UE capability request message after the handover is completed, and verify the UE capability after the UE returns its UE capability, thereby ensuring the security. The detailed steps of the above method have been described in the embodiment as illustrated in FIG. 2, and herein the redundant description is not repeated.

Figure 10:
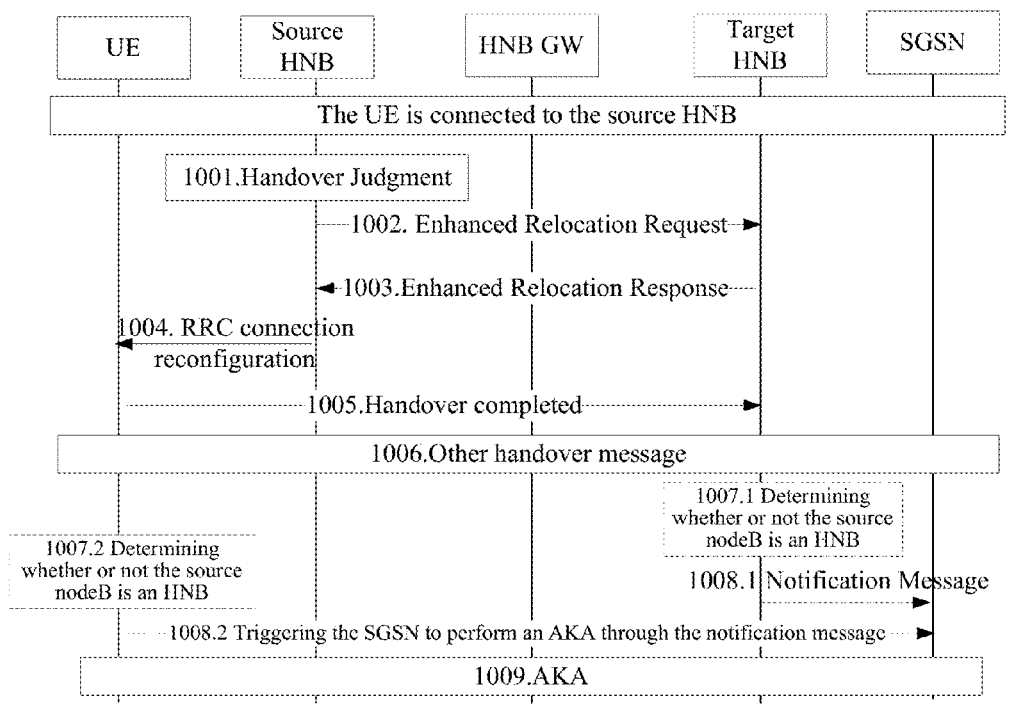
FIG. 10 is Flowchart 3 of a system interaction according to the first embodiment of the present invention.

FIG. 10 is a flowchart of a key separation method of this embodiment when a handover signaling is terminated at an HNB GW of the source node, and there is Iur interface between the source node and the target node. Please refer to FIG. 10, the flow includes:

Steps 1001-1006: same as the existing handover procedure;

Step 1007.1: the target HNB notifies the SGSN to trigger AKA; when the source node is an HNB, the target HNB notifies the SGSN to trigger AKA as soon as possible at an appropriate time, e.g., after the UE turns into idle state from active state, or the handover of the User Equipment from the source node to the target node is completed; the target HNB notifies the SGSN to delete the security context on the SGSN, so as to trigger the SGSN to perform AKA one time.

Wherein, the method for the target HNB to determine whether the source node is an HNB has been detailedly described in step 401, and herein the redundant description is not repeated.

Step 1007.2: the UE notifies the SGSN to trigger AKA: if the source node is an HNB, or the source node is an HNB and the target node is a RNC, the UE triggers the SGSN to perform AKA at an appropriate time, for example, 1) after the handover of the User Equipment from the source node to the target node is completed; or 2) after the movement of the User Equipment from the source node to the target node in idle state is completed; or Wherein, the example uses the case that the UE hands over from the source node to the target node, as an example, and when the UE moves from the source node to the target node in idle state, the method of the embodiment is also applicable. In that case, the UE may trigger the SGSN to perform AKA after the movement is completed.

3) after the UE turns into idle state from active state; or 4) the UE sets every bit of the stored KSI to 1; or 5) the UE sets stored value of "START" as threshold value "START_THRESHOLD".

The UE can trigger the SGSN to perform AKA in the above cases.

Wherein, the method for the UE to determine whether the target node is an RNC has been detailedly described in step 401, and herein the redundant description is not repeated.

1008.1/1008.2: the target HNB or the UE triggers the SGSN to perform AKA;

Wherein, the SGSN may be triggered to perform AKA through a notification message, but the embodiment is not limited thereto.

1009: AKA procedure.

With the above method, the SGSN may notify the target HNB of the CK and the IK again through SMC procedure, so that the UE uses new CK and IK at the target HNB, thereby achieving the separation of the keys of the source HNB and the key of the target HNB.

Wherein, during the signaling procedure in which the SGSN sends the updated CK and IK to the target node (e.g., the target HNB or RNC, hereinafter referred to as target HNB/RNC) through SMC procedure, in order to ensure that the target node can select an appropriate ciphering and integrity protection algorithm, the target node may add the UE security capability to a security mode command message forwarded to the UE, so that the UE performs a verifying according to the UE security capability sent by the target node to ensure the security. In addition, the target node may request the UE for the UE capability through an independent UE capability request message after the handover is completed, and verify the UE capability after the UE returns its UE capability, thereby ensuring the security. The detailed steps of the above method have been described in the embodiment as illustrated in FIG. 2, and herein the redundant description is not repeated.

Figure 11:
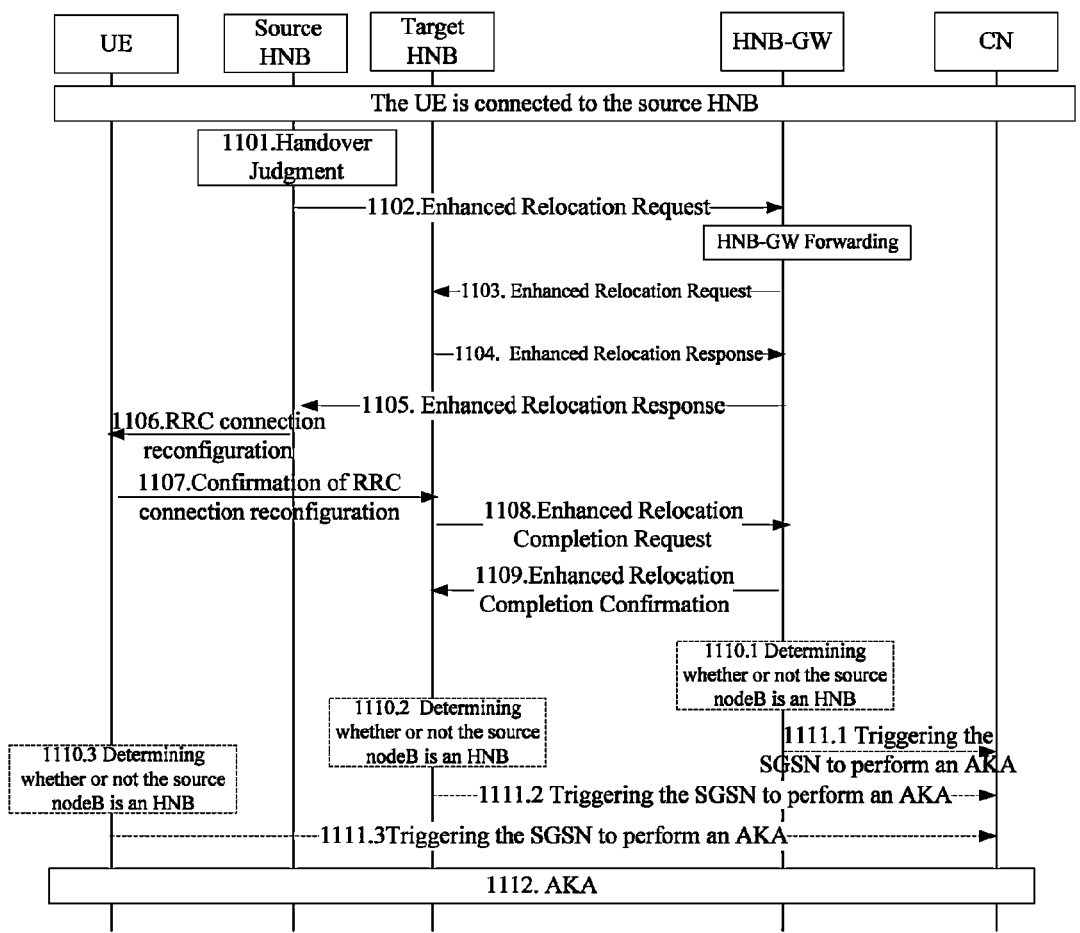
FIG. 11 is Flowchart 4 of a system interaction according to the first embodiment of the present invention.

FIG. 11 is a flowchart of a key separation method of this embodiment when a handover signaling is forwarded by a Home NodeB Gateway of the source node, and there is logic Iur interface between the source node and the target node, i.e., the handover signaling is forwarded via the HNB GW. Please refer to FIG. 11, the flow includes:

Steps 1101-1109: same as the existing handover procedure;

Step 1110.1: the HNB GW notifies the SGSN to trigger AKA with the same method as illustrated in FIG. 8. When the source node is HNB, or the source node is HNB and the target node is RNC, the HNB GW notifies the SGSN to trigger AKA as soon as possible at an appropriate time, e.g., after the UE turns into idle state from active state, or the HNB GW receives Iu Release message, or the handover of the User Equipment from the source node to the target node is completed; the HNB GW notifies the SGSN to delete the security context on the SGSN, so as to trigger the SGSN to perform AKA one time as soon as possible.

Wherein, the method for the HNB GW to determine whether the source node is HNB has been detailedly described in step 401, and herein the redundant description is not repeated.

Step 1110.2: the target HNB notifies the SGSN to trigger AKA: when the source node is HNB, the target HNB notifies the SGSN to trigger AKA as soon as possible at an appropriate time, e.g., after the UE turns into idle state from active state, or the handover of the User Equipment from the source node to the target node is completed; the target HNB notifies the SGSN to delete the security context on the SGSN, so as to trigger the SGSN to perform AKA one time as soon as possible.

Wherein, the method for the target HNB to determine whether the source node is HNB has been detailedly described in step 401, and herein the redundant description is not repeated.

Step 1110.3: the UE notifies the SGSN to trigger AKA, if the source node is HNB, or the source node is HNB and the target node is RNC, the UE triggers the SGSN to perform AKA at an appropriate time, for example, 1) after the handover of the User Equipment from the source node to the target node is completed; or 2) after the movement of the User Equipment from the source node to the target node is completed in idle state; or In which, the embodiment uses the case that the UE hands over from the source node to the target node as an example, and when the UE moves from the source node to the target node in idle state, the method of the embodiment is also applicable. In that case, the UE may trigger the SGSN to perform AKA after the movement is completed.

3) after the UE turns into idle state from active state; or 4) the UE sets every bit of the stored KSI to 1;

5) the UE sets stored value of "START" as threshold value of "START_THRESHOLD".

The UE can trigger the SGSN to perform AKA in the above cases.

Wherein, the method for the UE to determine whether the target node is RNC has been detailedly described in step 401, and herein the redundant description is not repeated.

The above description describes procedure for the target HNB or the UE to trigger the SGSN to perform AKA. In this embodiment, when it is desired to trigger AKA by HNB GW, the HNB GW needs to parse handover-related messages, and herein the redundant description is omitted.

Step 1111.1/1111.2/1111.3: the HNB GW, the target HNB or the UE triggers the SGSN to perform AKA;

Wherein, the SGSN may be triggered to perform AKA through a notification message, but the embodiment is not limited thereto.

Step 1112: AKA procedure.

With the above method, the SGSN may notify the target HNB of the CK and the IK through SMC procedure, so that the UE uses new CK and IK at the target HNB, thereby achieving the separation of the keys of the source HNB and the key of the target HNB.

Wherein, during the signaling procedure in which the SGSN sends the updated CK and IK to the target node (e.g., the target HNB or RNC, hereinafter referred to as target HNB/RNC) through SMC procedure, in order to ensure that the target node can select an appropriate ciphering and integrity protection algorithm, the target node may add the UE security capability to a security mode command message forwarded to the UE, so that the UE performs verifying according to the UE security capability sent by the target node to ensure the security. In addition, the target node may request the UE for the UE capability through an independent UE capability request message after the handover is completed, and verify the UE capability after the UE returns its UE capability, thereby ensuring the security. The detailed steps of the above method have been described in the embodiment as illustrated in FIG. 2, and herein the redundant description is not repeated.

The method of this embodiment triggers the SGSN in various manners to perform AKA to update the CK and the IK used by the target node, thereby achieving the separation of the key of the source node from that of the target node.

Embodiment 2

Figure 12:
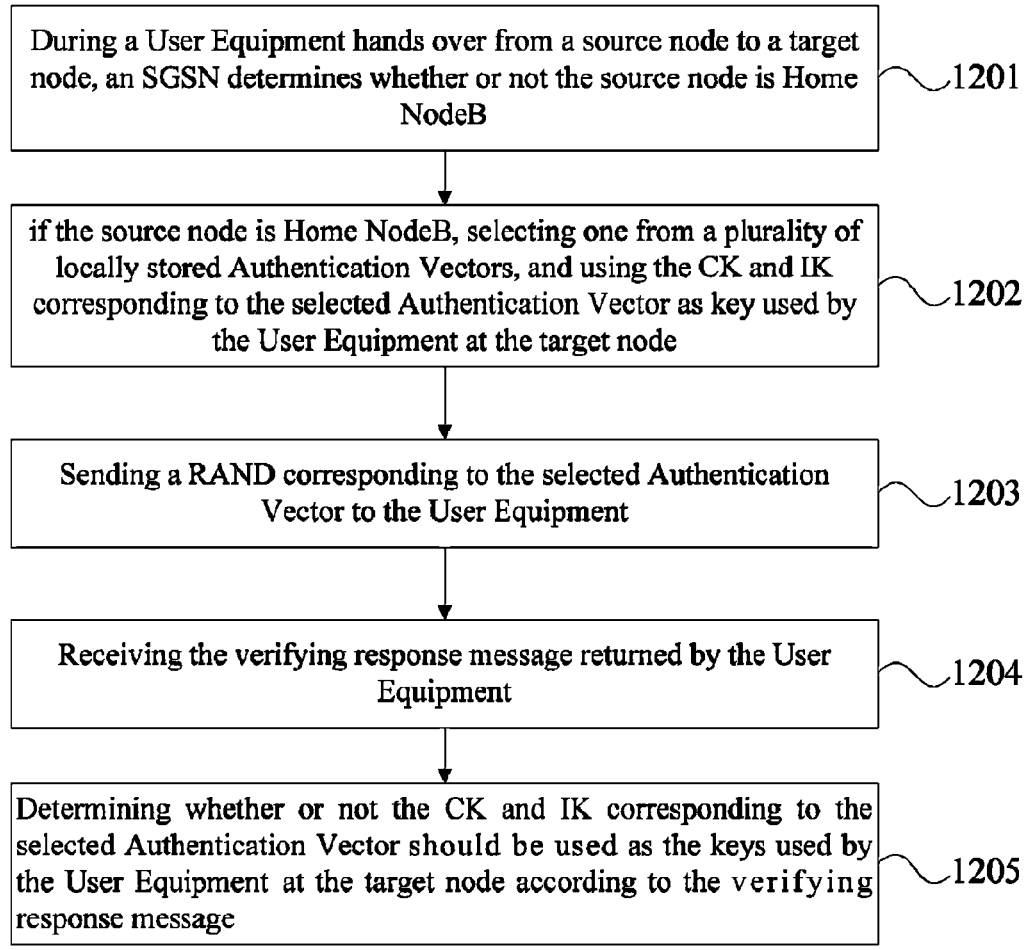
FIG. 12 is a flowchart of a method on SGSN side according to the second embodiment of the present invention.

FIG. 12 is a flowchart of a key separation method provided by this embodiment. The method is applied to SGSN in the handover scenario where a handover signaling passes the Core Network to separate the key of a source node (e.g., source HNB) and the key of a target node (e.g., target HNB or target RNC, (hereinafter referred to as target HNB/RNC)). Please refer to FIG. 12, the method includes:

Step 1201: during a User Equipment hands over from a source node to a target node, an SGSN determines whether the source node is Home NodeB;

wherein, the method for the SGSN to determine whether the source node is Home NodeB is same as that described in step 201, and herein the redundant description is omitted.

Step 1202: if the source node is Home NodeB, selecting one from a plurality of locally stored Authentication Vectors, and using a Ciphering Key and Integrity Key (CK, IK) corresponding to the selected Authentication Vector as key used by the User Equipment at the target node;

wherein, when there is only one locally stored Authentication Vector, it is possible to request a Home Subscriber Server HSS for a group of Authentication Vectors, and then to select one from the group of Authentication Vectors.

In one example, the SGSN may further determine whether the target node is Radio Network Controller RNC. The SGSN is configured, when the source node is HNB and the target node is RNC, to trigger a procedure of performing key separation using Authentication Vectors, i.e., selecting one from a plurality of locally stored Authentication Vectors, and using Ciphering Key and Integrity Key corresponding to the selected Authentication Vector as key used by the User Equipment at the target node.

Step 1203: sending a random number RAND corresponding to the selected Authentication Vector to the User Equipment, so that the User Equipment generates CK and IK according to the RAND.

In this example, a verifying flag AUTN corresponding to the selected Authentication Vector may be also sent to the User Equipment, for the verifying performed by the User Equipment.

In this example, if the User Equipment verifies the AUTN or calculates RES after generating CK and IK according to the RAND, and returns verifying response message, the method of this example further includes:

Step 1204: receiving the verifying response message returned by the User Equipment, wherein the verifying response message includes the verifying result with respect to the AUTN by the User Equipment and/or the RES calculated by the User Equipment;

Step 1205: if the verifying result indicates that the verifying fails, or the RES calculated by the UE is inconsistent with the XRES corresponding to the selected Authentication Vector, CK and IK corresponding to the selected Authentication Vector would not be used as keys used by the User Equipment at the target node.

Wherein, the embodiment is not limited to returning the above information using the verifying response message, and other message may be used, e.g., a part of other handover message such as a relocation completion message.

With the method of this embodiment, when the UE hands over from the source HNB to the target HNB/RNC, the SGSN reselects a new AV from a plurality of locally stored Authentication Vectors AVs, and uses CK and IK corresponding to this AV as keys used by the UE at the target HNB/RNC. The SGSN sends a RAND corresponding to this AV to the UE, and the UE derives new CK and IK according to the RAND, thereby ensuring the separation of the key of the source HNB from the key of the target HNB/RNC.

Figure 13:
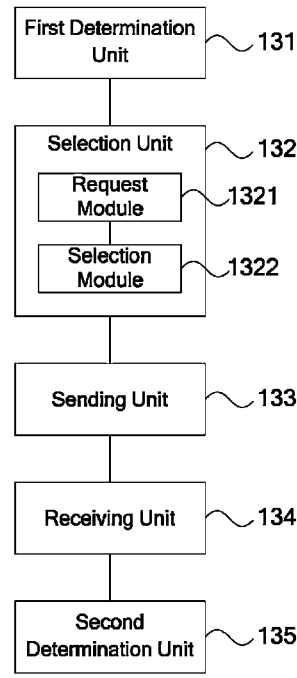
FIG. 13 is a constitutional block diagram of an SGSN according to Embodiment 2 of the present invention.

FIG. 13 is a constitutional block diagram of SGSN of this embodiment. Please refer to FIG. 13, the SGSN includes:

a first determining unit 131, configured to determine whether a source node is Home NodeB, when a User Equipment hands over from the source node to a target node;

a selection unit 132, configured to select one from a plurality of locally stored Authentication Vectors when the first determining unit 131 determines that the source node is Home NodeB, and use CK and IK corresponding to the selected Authentication Vector as keys used by the User Equipment at the target node; and a sending unit 133, configured to send RAND corresponding to the Authentication Vector selected by the selection unit 132 to the User Equipment, so that the User Equipment generates the CK and the IK according to the RAND.

In one example, the first determining unit 131 is further configured to determine whether the target node is Radio Network Controller RNC, and the selection unit 132 is specifically configured to select one from a plurality of locally stored Authentication Vectors when the source node is HNB and the target node is RNC, and use CK and IK corresponding to the selected Authentication Vector as keys used by the User Equipment at the target node.

In one example, the selection unit 132 may include:

a request module 1321, configured to request the HSS for a group of Authentication Vectors when there is only one locally stored Authentication Vector;

a selection module 1322, configured to select one from the group of Authentication Vectors obtained upon the request from the request module 1321.

In another example, the sending unit 133 may also send AUTN corresponding to the selected Authentication Vector to the User Equipment for verifying, and the User Equipment may calculate RES according to this. In that case, the SGSN may further include:

a receiving unit 134, configured to receive verifying response message returned by the User Equipment, wherein the verifying response message includes verifying result with respect to the AUTN by the User Equipment and/or the RES calculated by the User Equipment;

a second determining unit 135, configured to determine that CK and IK corresponding to the selected Authentication Vector should not be used as the keys used by the User Equipment at the target node, when the verifying result in the verifying response message received by the receiving unit 134 indicates that the verifying fails, or the RES calculated by the User Equipment is inconsistent with the XRES corresponding to the selected Authentication Vector.

The constituent parts of the SGSN of this embodiment are used for implementing the steps of the aforementioned method embodiment as illustrated in FIG. 12. The steps have been detailedly described in the method embodiment as illustrated in FIG. 12, and herein the abundant description is omitted.

The SGSN of this embodiment reselects CK and IK to be used by the new target node, thereby achieving the separation of the key of the source node from that of the target node.

Figure 14:
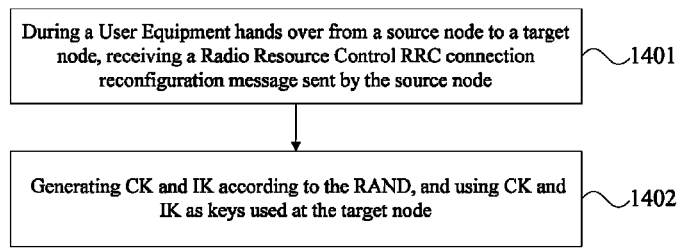
FIG. 14 is a flowchart of a method on UE side according to the second embodiment of the present invention.

FIG. 14 is a flowchart of a key separation method according to an embodiment of the present invention, the method being applicable to a User Equipment in a handover scenario where a handover signaling passes a Core Network. Please refer to FIG. 14, the method includes:

Step 1401: during a User Equipment hands over from a source node to a target node, receiving a Radio Resource Control RRC connection reconfiguration message sent by the source node, the RRC connection reconfiguration message including RAND corresponding to the Authentication Vector selected by an SGSN;

In one example, the RRC connection reconfiguration message may further include AUTN corresponding to the Authentication Vector selected by the SGSN for verifying.

Step 1402: generating CK and IK according to the RAND, and using CK and IK as keys used at the target node.

In one example, after generating new CK and IK according to the RAND, the User Equipment may verify the AUTN according to the parameters in the AUTN and the RAND, and return a verifying result to the SGSN, so that the SGSN determines whether CK and IK corresponding to the selected Authentication Vector should be used as keys used by the User Equipment at the target node, according to the verifying result.

Wherein, the verifying result may be sent to the SGSN through verifying response message or other message such as relocation completion message, and the embodiment is not limited thereto. If the verifying fails, the SGSN does not use the CK and IK corresponding to the selected Authentication Vector as keys used by the User Equipment at the target node.

In another example, the UE may further calculate RES according to the RAND, and return the calculated RES to the SGSN, so that the SGSN determines whether the CK and the IK corresponding to the selected Authentication Vector should be used as keys used by the User Equipment at the target node, according to the RES.

Wherein, similarly, the RES may be sent to the SGSN through verifying response message or other message, and the embodiment is not limited thereto. If the RES is inconsistent with the XRES corresponding to the Authentication Vector selected by the SGSN, the SGSN does not use the CK and the IK corresponding to the selected Authentication Vector as the keys used by the User Equipment at the target node.

With the method of this embodiment, the UE may derive new CK and IK according to the RAND, and the SGSN reselects CK and IK used by the new target node, thereby achieving the separation of the key of the source node from that of the target node.

Figure 15:
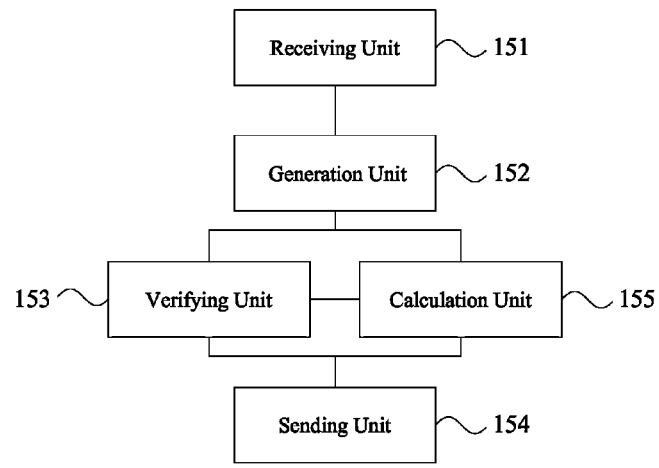
FIG. 15 is a constitutional block diagram of a UE according to the second embodiment of the present invention.

FIG. 15 is a constitutional block diagram of a User Equipment according to an embodiment of the present invention. Please refer to FIG. 15, the User Equipment includes:

a receiving unit 151, configured to receive RRC connection reconfiguration message sent by a source node, when the User Equipment hands over from the source node to a target node, the RRC connection reconfiguration message including a RAND corresponding to the Authentication Vector selected by SGSN;

a generation unit 152, configured to generate CK and IK according to the RAND in the RRC connection reconfiguration message received by the receiving unit 151, and to use the CK and the IK as keys used at the target node.

In one example, the RRC connection reconfiguration message received by the receiving unit 151 further includes AUTN corresponding to the Authentication Vector selected by the SGSN, and the User Equipment further includes:

a verifying unit 153, configured to verify the AUTN according to the parameters in the AUTN and RAND in the RRC connection reconfiguration message received by the receiving unit 151;

a sending unit 154, configured to send verifying response message including verifying result to the SGSN after the verifying by the verifying unit 153, so that the SGSN determines whether the CK and the IK corresponding to the selected Authentication Vector should be used as the keys used by the User Equipment at the target node, according to the verifying result; if the verifying result indicates that the verifying fails, the SGSN does not use the CK and the IK corresponding to the Authentication Vector as the keys used by the UE at the target node.

In another example, the UE further includes:

a calculation unit 155, configured to calculate RES according to the RAND in the RRC connection reconfiguration message received by the receiving unit 151;

the sending unit 154 is further configured to send the RES calculated by the calculation unit 155 to the SGSN through the verifying response message, so that the SGSN determines whether the CK and the IK corresponding to the selected Authentication Vector should be used as the keys used by the User Equipment at the target node according to the RES; if the RES is inconsistent with XRES corresponding to the Authentication Vector selected by the SGSN, the SGSN does not use the CK and the IK corresponding to the Authentication Vector as the keys used by the User Equipment at the target node.

The constituent parts of the UE of this embodiment are used for implementing the steps of the aforementioned method embodiment as illustrated in FIG. 14. The steps have been detailedly described in the method embodiment as illustrated in FIG. 14, and herein the redundant description is omitted.

The UE of this embodiment may derive new CK and IK according to the RAND, and the SGSN reselects Ciphering Key and Integrity Key used by the new target node, thereby achieving the separation of the key of the source node from that of the target node.

Figure 16:
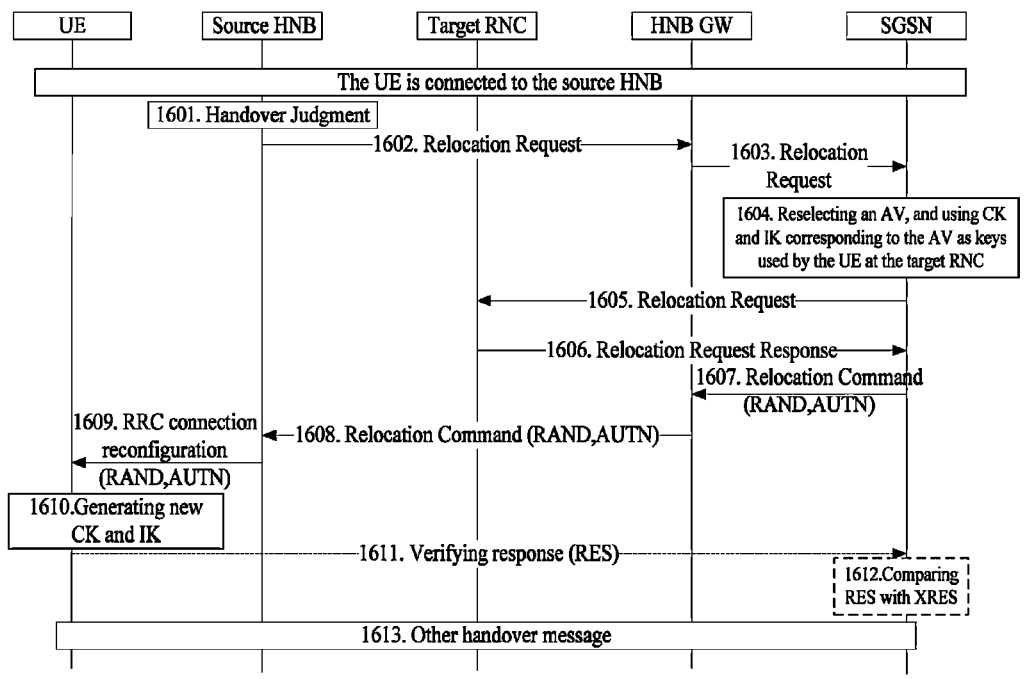
FIG. 16 is a flowchart of a handover according to the second embodiment of the present invention.

In order that the key separation method of this embodiment is more apparent and understandable, the detailed descriptions thereof are given as follows with reference to the flow as illustrated in FIG. 16. Please refer to FIG. 16, the flow includes:

Step 1601: a source HNB decides a handover to a target RNC;

Step 1602: the source HNB sends a relocation request message to a HNB GW;

Step 1603: the HNB GW further sends the relocation request message to an SGSN of a Core Network;

Step 1604: if the source base station of the handover is HNB, or the source base station of the handover is HNB and the target node of the handover is RNC, the SGSN reselects a new AV from a plurality of locally stored AVs, and uses CK and IK corresponding to this AV as keys used by the UE at the target HNB/RNC.

Wherein, if the SGSN only has one Authentication Vector AV, the SGSN requests HSS for a group of Authentication Vectors AV, selects one AV therefrom, and uses CK and IK corresponding to this AV as keys used by the UE at the target HNB/RNC.

Wherein, the method for the SGSN to judge whether the source base station is HNB may be: if the source node is HNB, the HNB carries RNC ID of the HNB GW in the relocation request message sent to the SGSN, and the SGSN can judge that the relocation request message is forwarded from the HNB GW (the HNB GW will register to the SGSN when accessing the network), thereby the SGSN can recognize that the source base station is HNB. Of course, the SGSN may judge whether the source nodeB is HNB with other method, for example the SGSN can judge whether the source base station is HNB by allocating different RNC ID ranges to the HNB GW and the RNC, and the embodiment is not limited thereto.

Step 1605: the SGSN sends the relocation request message to the target RNC;

Step 1606: the target RNC returns a relocation request response message to the SGSN;

Step 1607: the SGSN sends to the HNB GW a relocation command message that carries RAND corresponding to the AV;

Optionally, the message may further carry AUTN corresponding to the AV.

Step 1608: the HNB GW forwards the relocation command message that carries the RAND to the source HNB.

Step 1609: the source HNB sends to the UE the RRC connection reconfiguration message carrying RAND corresponding to the AV selected by the SGSN;

Step 1610: after receiving the RAND, the UE generates new CK and IK according to the RAND;

wherein, if the above message carries AUTN, the UE may verify the AUTN according to the parameters in the AUTN and RAND; if the verifying fails, verifying failure information is returned to the SGSN, and the SGSN does not use the CK and the IK corresponding to the AV as the keys used by the UE at the target HNB/RNC.

Wherein, the UE may calculate RES according to the RAND.

Step 1611: after verifying the AUTN or calculating the RES, the UE returns verifying response message to the SGSN to notify the SGSN of the verifying result and the RES calculated by the UE;

wherein, the verifying response message may be sent to the SGSN as a part of other handover message such as a relocation completion message, and the embodiment is not limited thereto.

Step 1602: the SGSN compares the RES and the XRES corresponding to the AV, and if they are different from each other, the SGSN does not use the CK and the IK corresponding to the AV as the key pair used by the UE at the target HNB/RNC;

Step 1613: other handover message, i.e., the rest of the handover procedure.

With the method of this embodiment, the SGSN may notify the target RNC of CK and IK through SMC procedure, so that the UE uses new CK and IK at the target RNC, thereby achieving the separation of the key of the source HNB from that of the target RNC.

Embodiment 3

Figure 17:
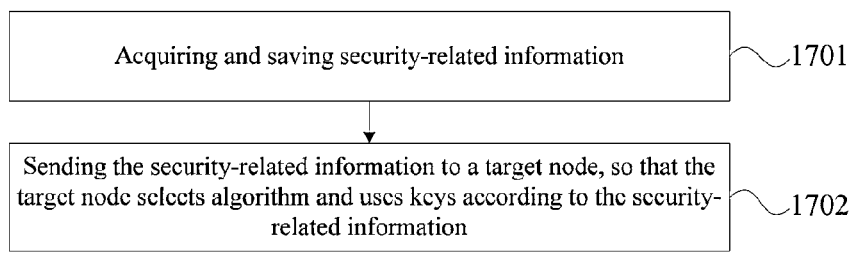
FIG. 17 is a flowchart of a method for providing security-related information according to the second embodiment of the present invention.

FIG. 17 is a flowchart of a security-related information providing method provided by the embodiment. The embodiment is applicable to a handover scenario where a handover signaling between HNBs is terminated at an HNB GW and there is no direct interface between HNBs. Please refer to FIG. 17, the method is applied to the Home NodeB Gateway (HNB GW), the method including:

Step 1701: acquiring and saving security-related information including a list of ciphering and integrity protection algorithms allowed by Core Network and Ciphering Key and Integrity Key of current user plane;

wherein, there are different methods for the HNB GW to acquire the security-related information according to whether the UE accesses the network from the HNB or from the RNC. Different examples are given as follows.

Step 1702: sending the security-related information to a target node, so that the target node selects algorithm and uses keys according to the security-related information.

In the conventional hard handover procedure, the SGSN sends to the target RNC the list of ciphering and integrity protection algorithms allowed by the Core Network and the Ciphering Key and Integrity Key of the current user plane, so that the target RNC makes a selection for usage. If the SGSN of the Core Network does not participate in the handover of the UE under the HNB, according to the prior art, the target HNB cannot acquire the list of ciphering and integrity protection algorithms allowed by the Core Network and the Ciphering Key and Integrity Key of the current user plane.

The embodiment acquires and saves the security-related information through the HNB GW, and sends to the target node as demand, so that the target node selects the algorithm and acquires the keys of the user plane according to this, thus well solving the above problem.

Figure 18:
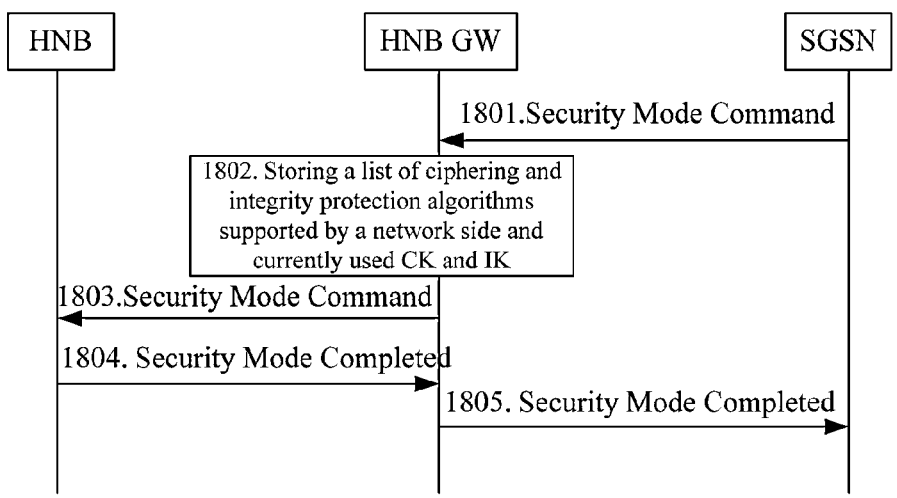
FIG. 18 is Flowchart 1 of a system interaction according to the embodiment shown in FIG. 17.

FIG. 18 is a flowchart of an example of the embodiment. Please refer to FIG. 18, if a UE accesses the network from HNB, the UE may acquire the security-related information during a SMC (Security Mode Command) procedure. In each SMC, the HNB GW parses a security mode command message sent by the SGSN, and acquires and saves the security-related information (i.e., the ciphering and integrity protection information) carried in the security mode command message. The security-related information includes a list of ciphering and integrity protection algorithms allowed by a Core Network and Ciphering Key and Integrity Key of a current user plane. Please refer to FIG. 18, the flow includes:

Step 1801: an SGSN sends to HNB GW a security mode command message that carries ciphering and integrity protection information including a list of ciphering and integrity protection algorithms allowed by a Core Network and Ciphering Key and Integrity Key of a current user plane;

Step 1802: the HNB GW parses the security mode command message sent by the SGSN, and acquires and saves the ciphering and integrity protection information carried in the message;

Step 1803: the HNB GW forwards the security mode command message to the HNB;

Step 1804: the HNB sends a security mode completion message to the HNB GW;

Step 1805: the HNB GW forwards the security mode completion message to the SGSN.

Thereby, the security-related information is acquired by the HNB GW in the SMC procedure, and can be provided to the target HNB for selection of the algorithm and usage of the keys of the user plane, thus solving the problem that the target HNB cannot acquire the a list of ciphering and integrity protection algorithms allowed by a Core Network and Ciphering Key and Integrity Key of a current user plane due to that the SGSN does not participate in the handover of the UE under the HNB.

Figure 19:
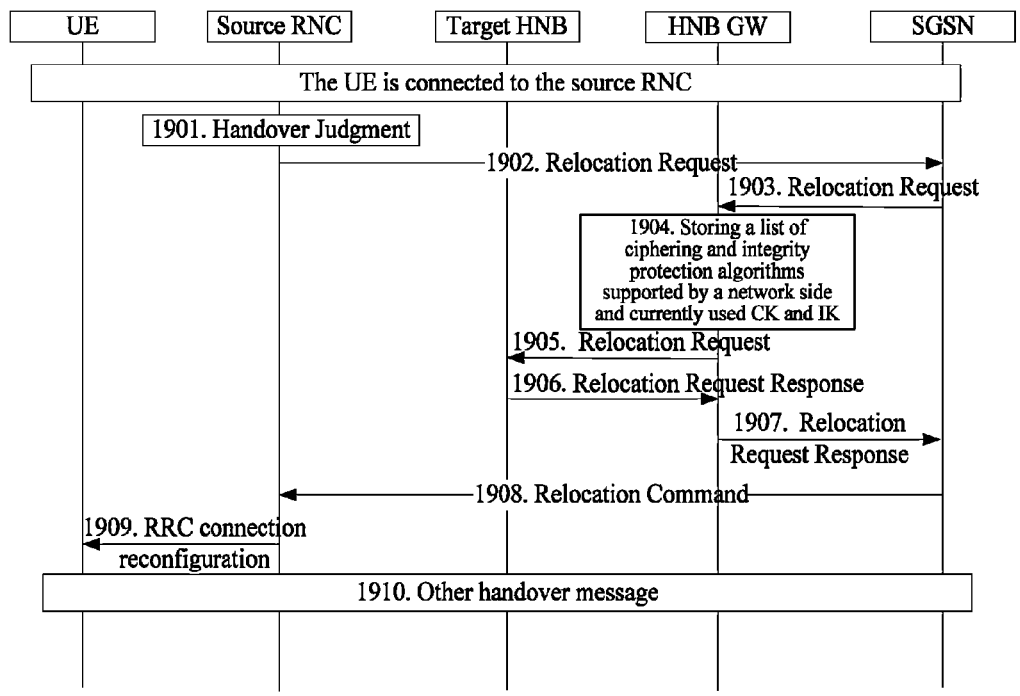
FIG. 19 is Flowchart 2 of a system interaction according to the embodiment shown in FIG. 17.

FIG. 19 is a flowchart of another example of the embodiment. Please refer to FIG. 19, if a UE attaches to a network from an RNC, the UE may acquire the security-related information during the procedure of a handover from the RNC to an HNB. The scenario where a handover signaling between the HNBs is terminated at the HNB GW will not occur until the UE hands over from the RNC to the HNB. In that case, during the procedure of the handover of the UE from the RNC to the HNB, the SGSN carries the ciphering and integrity protection information in a handover request message sent to the target HNB, and the HNB GW can acquire and save such information. Please refer to FIG. 19, the procedure includes:

Step 1901: a source RNC decides a handover to a target HNB;

Step 1902: the source RNC sends a relocation request message to an SGSN;

Step 1903: the SGSN sends a relocation request message to an HNB GW;

wherein, the relocation request message includes ciphering and integrity protection information containing a list of ciphering and integrity protection algorithms allowed by a Core Network and the current Ciphering Key and Integrity Key.

Step 1904: the HNB GW parses the relocation request message sent by the SGSN, and acquires and saves the ciphering and integrity protection information carried in the message;

Step 1905: the HNB GW sends a relocation request message to the target HNB;

Steps 1906 to 1910: other handover message, i.e., the rest of the handover procedure.

Thereby, the security-related information is acquired by the HNB GW in a procedure of the handover from the RNC to the HNB, and can be provided to the target HNB for selection of the algorithm and usage of the keys of the user plane, thus solving the problem that the target HNB cannot acquire the list of a list of ciphering and integrity protection algorithms allowed by a Core Network and Ciphering Key and Integrity Key of a current user plane due to that the SGSN does not participate in the handover of the UE under the HNB.

Figure 20:
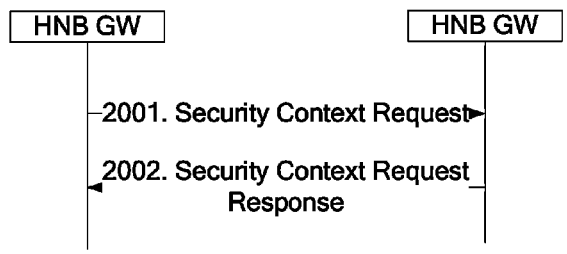
FIG. 20 is Flowchart 3 of a system interaction according to the embodiment shown in FIG. 17.

FIG. 20 is a flowchart of another example of the embodiment. As shown in FIG. 20, after a UE accesses from an HNB, an HNB GW may acquire security-related information from an SGSN through a dedicated message. Please refer to FIG. 20, the flow includes:

Step 2001: an HNB GW sends a security context request message to an SGSN, to request the SGSN to send security-related information to the HNB GW; and Step 2002: the SGSN returns to the HNB GW a security context response message that includes ciphering and integrity protection information containing a list of ciphering and integrity protection algorithms allowed by a Core Network and current Ciphering Key and Integrity Key.

Thereby, the security-related information is acquired by the HNB GW through a dedicated message, and can be provided to the target HNB for selection of the algorithm and usage of the keys of the user plane, thus solving the problem that the target HNB cannot acquire the a list of ciphering and integrity protection algorithms allowed by a Core Network and Ciphering Key and Integrity Key of a current user plane due to that the SGSN does not participate in the handover of the UE under the HNB.

Figure 21:
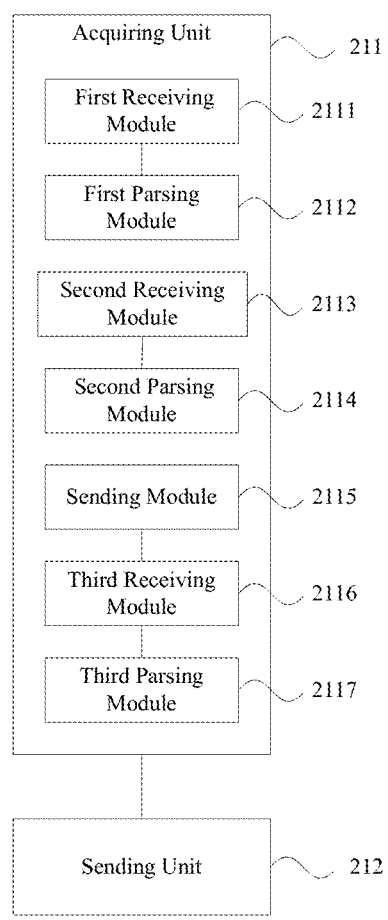
FIG. 21 is a constitutional block diagram of a Home NodeB Gateway according to the third embodiment of the present invention.

FIG. 21 is a constitutional block diagram of an HNB GW provided by the embodiment. Please refer to FIG. 21, the HNB GW includes:

an acquiring unit 211, configured to acquire and save security-related information including a list of ciphering and integrity protection algorithms allowed by a Core Network and Ciphering Key and Integrity Key of a current user plane; and a sending unit 212, configured to send the security-related information acquired by the acquiring unit 211 to a target node, so that the target node selects algorithm and uses keys according to the security-related information.

In one example, the acquiring unit 211 may include:

a first receiving module 2111, configured to receive a security mode command message sent by an SGSN, the security mode command message including the security-related information;

a first parsing module 2112, configured to parse the security mode command message received by the first receiving module 2111, and acquire and save the security-related information from the security mode command message.

In another example, the acquiring unit 211 may include:

a second receiving module 2113, configured to receive the relocation request message sent by the SGSN, the relocation request message including the security-related information;

a second parsing module 2114, configured to parse the relocation request message received by the second receiving module 2113, and acquire and save the security-related information from the relocation request message.

In another example, the acquiring unit 211 may include:

a sending module 2115, configured to send a security context request message to the SGSN, to request the SGSN to send the security-related information to the Home NodeB Gateway;

a third receiving module 2116, configured to receive a security context response message returned by the SGSN the security context response message including the security-related information;

a third parsing module 2117, configured to parse the security context response message received by the third receiving module 2116, and acquire and save the security-related information from the security context response message.

The constituent parts of the Home NodeB Gateway of this embodiment are used for implementing the steps of the aforementioned method embodiment. The steps have been detailedly described in the aforementioned method embodiment, and herein the redundant description is omitted.

With the Home NodeB Gateway of this embodiment, in a case where a handover signaling between the HNBs is terminated at the HNB GW and there is no direct interface between the HNBs, it is possible to acquire the security-related information through various means, and to provide such security-related information to the target node, so that the target HNB selects the algorithm and uses the keys of the user plane according to this, thus solving the problem that the target HNB cannot acquire the list of ciphering and integrity protection algorithms allowed by a Core Network and Ciphering Key and Integrity Key of a current user plane due to that the SGSN does not participate in the handover of the UE under the HNB.

A person skilled in the art will appreciate that all or a part of steps for implementing the above method embodiments may be completed by instructing relevant hardware through a program that may be stored in a computer readable storage medium, and upon being executed, the program performs the steps including the above method embodiments. The storage medium may include various mediums capable of storing program codes, such as ROM, RAM, magnetic disk and optical disk.

The above embodiments make further detailed descriptions of the object, technical solutions and beneficial effects of the present invention. It shall be understood that the above descriptions are just preferred embodiments of the present invention and cannot define the protection scope of the present invention. Any modification, equivalent replacement and improvement under the spirit and principle of the present invention shall fall within the protection scope of the present invention.

What is claimed is:

1. A key separation method applicable to a Serving GPRS Support Node (SGSN), comprising:
    determining whether a source node is a Home NodeB (HNB), when one of the following occurs: (a) a User Equipment hands over from the source node to a target node, and (b) when the User Equipment moves from the source node to the target node in an idle state; and
    when the source node is the Home NodeB, triggering an Authentication and Key Agreement procedure according to an operator's policy, to update a Ciphering Key and Integrity Key,
    wherein when a relocation request message sent by the source node to the SGSN carries a radio network controller identification (RNC ID) of an HNB gateway (GW), the SGSN determines that the source node is an HNB.

2. The method according to claim 1, wherein
    after determining whether the source node is the Home NodeB, the method further comprises:
    determining whether the target node is a Radio Network Controller;
    when the source node is the Home NodeB, triggering the Authentication and Key Agreement procedure according to the operator's policy;
    when the source node is the Home NodeB and the target node is the Radio Network Controller, triggering the Authentication and Key Agreement procedure according to the operator's policy.

3. The method according to claim 2, wherein triggering the Authentication and Key Agreement procedure according to the operator's policy comprises:
    triggering the Authentication and Key Agreement procedure after one of the following occurs: (a) the handover of the User Equipment from the source node to the target node is completed, (b) the movement of the User Equipment from the source node to the target node in the idle state is completed, and (c) a Home NodeB Gateway of the source node receives an IU Interface Release message.

4. The method according to claim 1, wherein triggering the Authentication and Key Agreement procedure according to the operator's policy comprises:
triggering the Authentication and Key Agreement procedure after one of the following occurs: (a) the handover of the User Equipment from the source node to the target node is completed, (b) the movement of the User Equipment from the source node to the target node in the idle state is completed, and (c) a Home NodeB Gateway of the source node receives an IU Interface Release message.

5. The method according to claim 1, further comprising:
sending the Ciphering Key and Integrity Key to the target node through a security mode command, so that the source node and the target node use different Ciphering Key and Integrity Key.

6. A Serving GPRS Support Node (SGSN), comprising:
a determining unit, configured to determine whether a source node is a Home NodeB (HNB), when one of the following occurs: (a) a User Equipment hands over from the source node to a target node, and (b) when the User Equipment moves from the source node to the target node in an idle state; and
a triggering unit, configured to trigger an Authentication and Key Agreement procedure according to an operator's policy, when the determining unit determines that the source node is the Home NodeB, so as to update a Ciphering Key and Integrity Key,
wherein when a relocation request message sent by the source node to the SGSN carries a radio network controller identification (RNC ID) of an HNB gateway (GW), the SGSN determines that the source node is an HNB.

7. The SGSN according to claim 6, wherein the determining unit is further configured to determine whether the target node is a Radio Network Controller, and the triggering unit is configured to trigger the Authentication and Key Agreement procedure according to the operator's policy when the source node is the Home NodeB and the target node is the Radio Network Controller.

8. The SGSN according to claim 7, wherein the triggering unit is configured to trigger the Authentication and Key Agreement procedure after the handover of the User Equipment from the source node to the target node is completed, or the movement of the User Equipment from the source node to the target node in idle state is completed, or Home NodeB Gateway of the source node receives an IU Interface Release message.

9. The SGSN according to claim 6, wherein the triggering unit is configured to trigger the Authentication and Key Agreement procedure after one of the following occurs: (a) the handover of the User Equipment from the source node to the target node is completed, (b) the movement of the User Equipment from the source node to the target node in the idle state is completed, and (c) a Home NodeB Gateway of the source node receives an IU Interface Release message.

10. The SGSN according to claim 6, further comprising:
a sending unit, configured to send the Ciphering Key and Integrity Key updated by the triggering unit to the target node through a security mode command, so that the source node and the target node use different Ciphering Key and Integrity Key.

11. A key separation method applicable to one of the group consisting of a Home NodeB (HNB) Gateway (GW), a User Equipment, and a target Home NodeB, comprising:
determining whether the source node is an HNB, when one of the following occurs: (a) the User Equipment hands over from a source node to a target node, and (b) the User Equipment moves from the source node to the target node in an idle state;
when the source node is the HNB, sending a notification message to a Serving GPRS Support Node (SGSN) to trigger the SGSN to perform an Authentication and Key Agreement procedure, to update a Ciphering Key and Integrity Key,
wherein when a relocation request message sent by the source node to the SGSN carries a radio network controller identification (RNC ID) of the HNB gateway (GW), the SGSN determines that the source node is the HNB.

12. The method according to claim 11, wherein sending the notification message to the SGSN comprises:
when the method is applied to the Home NodeB Gateway of the source node, the Home NodeB Gateway sends the notification message to the SGSN, when one of the following occurs: (a) the Home NodeB Gateway receives an IU Interface Release message, (b) the User Equipment hands over from the source node to the target node, and (c) the UE turns into the idle state from an active state;
when the method is applied to the User Equipment, the User Equipment sends the notification message to the SGSN, when one of the following occurs: (a) the handover of the User Equipment from the source node to the target node is completed, (b) the movement of the User Equipment from the source node to the target node in the idle state is completed, (c) the User Equipment turns into the idle state from the active state, (d) the User Equipment sets every bit of a locally stored Key Set Identifier (KSI) to 1, and (e) the User Equipment sets a locally stored state value as a threshold value; and
when the method is applied to the target Home NodeB, the target Home NodeB sends the notification message to the SGSN when one of the following occurs: (a) the handover of the User Equipment from the source node to the target node is completed, and (b) the User Equipment turns into the idle state from the active state.

13. The method according to claim 11, wherein when the method is applied to the Home NodeB Gateway or the User Equipment, after determining whether the source node is the Home NodeB, the method further comprises:
determining whether the target node is a Radio Network Controller;
wherein when the source node is the Home NodeB, sending the notification message to the SGSN to trigger the SGSN to perform the Authentication and Key Agreement procedure further comprises:
when the source node is the Home NodeB and the target node is the Radio Network Controller, sending the notification message to the SGSN to trigger the SGSN to perform the Authentication and Key Agreement procedure.

14. The method according to claim 13, wherein determining whether or not the source node is the Home NodeB comprises:

when the method is applied to the User Equipment, determining whether or not the source node is the Home NodeB when one of the following occurs: (a) the User Equipment hands over from the source node to the target node, and (b) the User Equipment moves from the source node to the target node in the idle state; and when the method is applied to the Home NodeB Gateway or the target Home NodeB, determining whether the source node is the Home NodeB Gateway when the User Equipment hands over from the source node to the target node.

15. The method according to claim 11, wherein determining whether the source node is the Home NodeB comprises:

when the method is applied to the User Equipment, determining whether the source node is the Home NodeB, when one of the following occurs: (a) the User Equipment hands over from the source node to the target node, and (b) the User Equipment moves from the source node to the target node in the idle state; and when the method is applied to the Home NodeB Gateway or the target Home NodeB, determining whether the source node is the Home NodeB Gateway when the User Equipment hands over from the source node to the target node.

* * * * *